(12) United States Patent
Buckholdt et al.

(10) Patent No.: US 11,132,740 B2
(45) Date of Patent: Sep. 28, 2021

(54) VOICE-BASED ORDER PROCESSING

(71) Applicant: NCR Corporation, Atlanta, GA (US)

(72) Inventors: Wayne Lawrence Buckholdt, Duluth, GA (US); Andrew Robert Hamilton, Dundee (GB)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/368,772

(22) Filed: Mar. 28, 2019

(65) Prior Publication Data
US 2020/0311804 A1 Oct. 1, 2020

(51) Int. Cl.
G06Q 30/06 (2012.01)
G06K 9/00 (2006.01)
G10L 15/22 (2006.01)
G10L 15/26 (2006.01)
G10L 15/08 (2006.01)

(52) U.S. Cl.
CPC ..... *G06Q 30/0641* (2013.01); *G06K 9/00624* (2013.01); *G10L 15/22* (2013.01); *G10L 15/26* (2013.01); G10L 2015/088 (2013.01); G10L 2015/225 (2013.01)

(58) Field of Classification Search
CPC G06Q 30/0641; G06K 9/00624; G10L 15/22; G10L 15/265; G10L 2015/088; G10L 2015/225
USPC ....................................................... 705/27.1
See application file for complete search history.

(56) References Cited

U.S. PATENT DOCUMENTS

| 2001/0002467 | A1* | 5/2001 | Ogo | G06Q 30/06 455/41.1 |
| 2003/0018531 | A1* | 1/2003 | Mahaffy | G07F 9/02 705/16 |
| 2004/0199425 | A1* | 10/2004 | Van Luchene | G06Q 30/06 705/15 |
| 2006/0218039 | A1* | 9/2006 | Johnson | G06Q 30/02 705/15 |

(Continued)

OTHER PUBLICATIONS

Dalike, Jim; "This Startup Is Bringing Alexa-Like AI to the Drive-Thru Window"; Feb. 27, 2019; Biz Journals (Year: 2019).*

(Continued)

*Primary Examiner* — Marissa Thein
*Assistant Examiner* — Thomas Joseph Sullivan
(74) *Attorney, Agent, or Firm* — Schwegman, Lundberg & Woessner

(57) ABSTRACT

A vehicle is detected at a drive thru terminal and an automated voice-based dialogue is established with a user in the vehicle and the terminal. An order is placed for a transaction using natural-language speech. The automated voice-based dialogue identifies commands, nouns associated with menu items, adjectives associated with modifying the menu items, prepositions associated with modifying the menu items, and exclamations associated with confirming the order and associated menu items. The automated speech is identified and processed based on a specific lexicon associated with a specific type of restaurant. The speech is translated into actions processed through an ordering system/interface as text-based instructions. Feedback for the order and guidance during the order are provided to the user through: speech played over a speaker associated with the terminal, text displayed on a display, and/or images associated with the ordered items.

15 Claims, 4 Drawing Sheets

(56) References Cited

U.S. PATENT DOCUMENTS

| | | | | |
|---|---|---|---|---|
| 2007/0007331 A1* | 1/2007 | Jasper | ............... | G07F 7/00 |
| | | | | 235/379 |
| 2008/0218313 A1* | 9/2008 | d'Hont | ............... | G06Q 30/0603 |
| | | | | 340/10.1 |
| 2008/0222004 A1* | 9/2008 | Pollock | ............. | G06Q 30/0603 |
| | | | | 705/15 |
| 2015/0310365 A1* | 10/2015 | Li | ................. | G06K 9/00771 |
| | | | | 705/7.38 |
| 2018/0253805 A1* | 9/2018 | Kelly | ................. | G06Q 20/322 |
| 2018/0276602 A1* | 9/2018 | Rivalto | ................ | G07F 7/08 |
| 2019/0108566 A1* | 4/2019 | Coleman | ........... | G06Q 30/0633 |
| 2019/0171711 A1* | 6/2019 | Carpenter, II | ......... | G10L 13/02 |
| 2020/0065881 A1* | 2/2020 | Truong | ............ | G06Q 30/0643 |

OTHER PUBLICATIONS

Apprente, Inc.; "Apprente Is Fully Automating Drive-Thru Ordering With Voice-Based Artificial Intelligence Agents"; Oct. 1, 2018; Intrado Global Newswire (Year: 2018).*

* cited by examiner

VOICE-BASED ORDER PROCESSING

BACKGROUND

Network-based shopping has steadily increased in recent years within the retail industry. Brick and mortar stores have suffered substantially as a result of this trend because of rent, costs, inventory of product, and staffing associated with maintaining the physical stores and loss of sales to online competition. One area where consumers are less likely to engage in shopping over the Internet is fast food, restaurants, and grocery stores. This is for a variety of reasons, such as consumers want these products at the time that they shop for those products and want their food while they are traveling, such that online ordering makes little sense.

Employee expense has become an issue for many retailers. This is particularly true in the fast food and restaurant industries. Many state and city governments have mandated minimum wage rates that are particular difficult for the industry to absorb. Customers are unwilling to pay significantly higher prices that would be necessary, in many cases, to cover the new wage rates. As a result, some retailers have been forced to reduce employee hours and/or close their businesses.

In the fast food industry, a drive thru ordering service is expected by consumers. Consumers have become accustomed to eating in their vehicles or picking up food to take home or to their offices. However, a drive thru usually requires at least one and in some cases two employees that are not available to prepare food orders and that are dedicated to taking drive thru orders, which these employees then enter into a terminal for order fulfillment processing by other employees. This adds to the number of employees needed to staff the restaurant and accordingly adds to the retailer's overall employee-associated expenses. With wage rates spiking, many fast food restaurants are finding it particularly difficult to stay in business and/or make a reasonable profit on their investment.

SUMMARY

In various embodiments, methods and a system for voice-based order processing are presented.

According to an embodiment, a method for voice-based processing is presented. More particularly, a voice dialogue is established with a user for an order at a drive thru terminal. Speech provided by user is translated into text commands associated with an order interface using a lexicon associated with a type of restaurant. The text commands are processed through the order interface. Speech feedback and guidance are provided at the drive thru terminal during the order. Finally, the order is completed at the drive thru terminal for subsequent order fulfillment processing.

DETAILED DESCRIPTION

Figure 1:
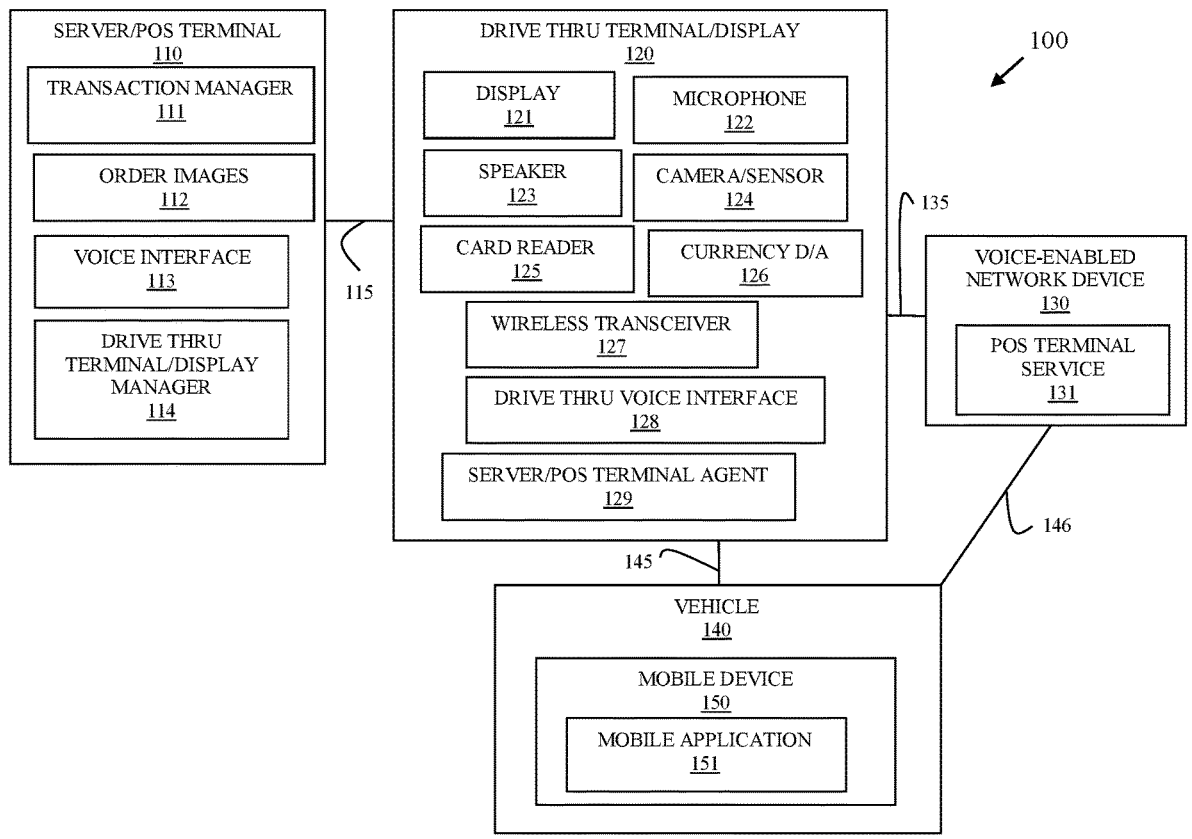
FIG. 1 is a diagram of a system for voice-based order processing, according to an example embodiment.

FIG. 1 is a diagram of a system 100 for voice-based order processing. The various components are illustrated and the arrangement of the components is presented for purposes of illustration only. It is to be noted that other arrangements with more or less components are possible without departing from the coded scan-based item processing teachings presented herein and below.

The techniques, methods, and system presented herein and below for voice-based order processing can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," and "user" may be used synonymously and interchangeably.

The system 100 includes a server/Point-Of-Sale (POS) terminal 110, a drive thru terminal/digital sign 120, optionally a voice-enabled network device 130, and a vehicle 140 that optionally includes a mobile device 150 associated with a user in the vehicle 140.

The server/POS terminal 100 includes at least one processor, memory, and non-transitory computer-readable storage medium. The non-transitory computer-readable storage medium includes executable instructions for a transaction manager 111, a voice interface 113, and a drive thru/display manager 114. The non-transitory computer-readable storage medium also includes order images for items on a menu. The executable instructions are executed by the processor from the non-transitory computer-readable storage medium to perform the processing discussed below for the transaction manager 111, the voice interface 113, and the drive thru terminal/display 114.

The drive thru terminal/display 120 includes at least one processor, memory, and a non-transitory computer-readable storage medium having executable instructions representing a drive thru voice interface 128 and a server/POS terminal agent 129. The drive thru terminal/display 120 also includes a display 121, a microphone 122, a speaker 123, a camera/sensor 124, optionally a card reader 125, optionally a currency dispenser/accepter (D/A) 126, and optionally a wireless transceiver 127. The processor executes the executable instructions from the non-transitory computer-readable storage medium to perform the processing discussed below with respect to the drive thru voice interface 128 and the server/POS terminal agent 129.

In an embodiment, the system 100 includes a network-enabled network device 130 that includes a processor, memory, and non-transitory computer-readable storage medium that includes a POS terminal service 131.

In an embodiment, the system 100 includes a mobile device 150 carried or operated by a user in the vehicle 140. The mobile device 150 includes executable instructions, memory, and a non-transitory computer-readable storage medium having executable instructions representing a mobile application 151. The processor executes the executable instructions to perform the processing discussed below with respect to the mobile application 151.

During operation of the system 100, a user in the vehicle while in front of the drive thru terminal/display 120 uses spoken natural language words and phrases to place an order from a menu associated with a restaurant/fast food establishment.

In an embodiment, the camera/sensor 124 detects a vehicle in front of the drive thru terminal/display 120 and initiates the drive thru voice interface 128.

In an embodiment, the camera/sensor 124 detects a vehicle in front of the drive thru terminal/display 120 and processes the server/POS terminal agent 129 through a wired or wireless connection 115 to the server/POS terminal 110. The voice interface 113 is then initiated on the server/POS terminal 110 providing audio feedback to the speaker 123 and receive speech input from the user through the microphone 122.

In an embodiment, the camera/sensor 124 detects a vehicle in front of the drive thru terminal/display 120 and processes the drive thru voice interface 128 to redirect speech input from the user received over the microphone 122 to the voice-enabled network device 135 over a wired or wireless connection 135. The voice-enabled network device 135 initiates the POS terminal service 131 for a dialogue with the user during the ordering and audio/speech-based feedback produced by the POS terminal service 131 is routed over connection 135 to be played over the speaker 123.

In an embodiment, the drive thru voice interface 128, the voice interface 113, and/or the POS terminal service 131 is initiated based on a plurality of predefined wake-up words or phrases, such as: "Hello," "I would like," "can I have," "can I get," and others that are typically used when starting an order. In an embodiment, the wake-up words or phrases may be presented on the display 121 for the user to see when at the drive thru terminal/display 120. An automated voice response from the drive thru voice interface 128 or the voice interface 113 may include: "Please tell me what you would like to order," "How can I serve you today," "Ready to take/receive your order," etc.

So, the drive thru voice interface 128, the voice interface 113, and/or the POS terminal service 131: can be initiated for an order based on automatic discovery of the vehicle 140 at the drive thru terminal/display 120 (through image processing) of images captured by the camera 124; can be initiated for an order based on automatic detection of the vehicle 140 through a sensor 124 (such as a light-based or motion-based sensor 124) that identifies the vehicle 140 at the drive thru terminal/display 120; and/or can be initiated for an order based on listening over the microphone 122 for predefined wake-up words or phrases.

In an embodiment, the voice-interface 128, the voice interface 113 and/or the POS terminal service 131 are automatically initiated for taking an interactive speech-based order with the user based on a machine-learning algorithm that is trained on images to determine when the vehicle 140 is present at the drive thru terminal/display 120.

Once the drive thru voice interface 128, the voice interface 113, and/or the POS terminal service 131 are initiated (either through automated vehicle 140 discovery or predefined wake up words or phrases). An interactive speech dialogue is initiated and the transaction manager 111 provides a transaction identifier for an order transaction. An initial greeting may be played over the speaker 123 to the customer and/or reproduced as text presented on the display. The transaction identifier starts a session or an interactive ordering dialogue for the user to communicate through speech an order and user-specific order details.

The voice interface 113, the drive thru voice interface 128, and/or the POS terminal service 131 provides a real-time speech-based interface for the user to verbally communicate an order. A dialogue is created during which speech from the user received over the microphone is converted to text (speech to text). The text is recognized and processed as commands and selections received from the user by the transaction manager 111. Output text that confirms order selections and order details for an order produced by the transaction manager 111 is processed by the voice interface 113, the drive thru voice interface 128, and/or the POS terminal service 131 to convey speech feedback for the order or speech instructions/guidance, which is played over the speaker 123 (text to speech). The feedback and instructions may also be concurrently presented on the display 121 by the server/POS terminal agent 129.

The lexicon of words and phrases are recognized and processed for speech-to-text, transaction processing of an order, and text-to-speech feedback are predefined and constrained to the menu and menu options available at the restaurant. This substantially improves accuracy. The predefined lexicon can include order-specific words and phrases as well, such words may include commands for: "want," "like," "make," "add," "order," "buy," "purchase," "cancel," "delete," "remove," "modify," "change," etc. The commands are identified as processing actions that are to be processed by the transaction manager 111 for a given order/transaction/session/dialogue. The supported nouns associated with commands vary based on the restaurant (fast food) type and the food menu of available food items. The nouns identity menu items associated with a given command. For example, a hamburger fast food restaurant may include nouns for: hamburger, cheeseburger, lettuce, tomato, onion, pickle, ketchup, mustard, mayo, fries, onion rings, soda (such as Coca-Cola®, Pepsi®, Sprite®, root beer, etc.), water, ice tea, coffee, etc. The adjectives can also be customized for the specific restaurant and its menu and menu options, such adjectives may include: small, medium, regular, large, extra-large, double, triple, Super-Size®, etc. The adjectives define characteristics of a given noun or set of nouns (such as a prepackaged meal). Prepositions may include: with, and without for including or not including something with a noun (menu item). The exclamations used for confirming an order is correct through speech feedback may include: yes, no, or variants such as, yea, nah, yep, nope, wrong, right, correct, incorrect.

In an embodiment, the supported lexicon is specific to a given restaurant type and provided through an added skill to an existing voice-enabled network service as a specialized skill represented by the POS terminal service 131. The existing voice-enabled network service can include by way of example, Siri®, Amazon Echo/Alexa®, Google Home®, etc. In this embodiment, the voice-enabled network device 130 is a modified version of one of these consumer-voice services that includes the specialized POS terminal service 131 as an enhanced skill for the existing voice-enabled network service. The POS terminal service 131 is coded for the specialized lexicon/dictionary and commands as discussed above and operates through the voice-enabled network device 130.

Words communicated through speech are received through the microphone 122 and translated to text by the voice interface 113, the drive thru voice interface 128, and/or the POS terminal service 131. Sentences then become text words that are recognized as parts of speech for the commands, the adjectives, the noun menu items, and prepositions, and exclamations. The components of the sentences are formatted as commands provided to an Application Programming Interface (API) of the transaction manager 111, the transaction manager 111 is processed as a component of the restaurant's POS terminal ordering system/interfaces. Output produced by the transaction manager 111 is translated to speech and played over the speaker 123 and/or presented on the display 121 during the order by the voice interface 113, the drive thru voice interface 128, and/or the POS terminal service 131. Any visual presented feedback or guidance during the transaction/dialogue is processed by the server POS terminal agent 129 to render such visual information on the display 121. The speech-based feedback and guidance during the transaction/dialogue is processed by the voice interface 113 the drive thru voice interface 128, and/or the POS terminal service 131 and played as audio over the speaker 123.

The order/transaction/dialogue is a real-time dialogue and session for a transaction and the transaction is for placing an order with the restaurant. The user provides natural language voice instructions and receives natural language speech feedback, speech confirmation, and speech-based help instructions or guidance as needed during the session for the transaction.

In an embodiment, the server/POS terminal agent 129 utilizes a collection of menu item images 113 that map to menu items for the menu of the restaurant. So, when a user orders through speech an item and image of that item is retrieved by the server/POS terminal agent 129 and presented on the display 121. The user can visually see what the user had communicated through speech as the items are ordered through speech by the user. This may be particularly helpful when a user sees that an image for an item ordered is not something that the user actually wanted (in other words the user may have said something different from what the user actually wanted). This allows for speech-based revisions and changes during the order. In addition, text associated with the order may be presented with the corresponding images.

In an embodiment, when the user initially starts an order with a wake up word, the voice interface 113, the drive thru voice interface 128, and/or the POS terminal service 131 may detect the language being spoken by the user and a dialect of a specific language. The voice interface 113, the drive thru voice interface 128, and/or the POS terminal service 131, and the server/POS terminal agent 129 then configure its speech and text provided as spoken and visual feedback and guidance for the detected language and dialect. So, any supported spoken language can be automatically recognized and used throughout the order/session/dialogue/transaction.

In an embodiment, if the voice interface 113, the drive thru voice interface 128, and/or the POS terminal service 131 may also upon completion of an order (with an exclamation being verified from the user for the order) provide speech instructions for the user to pay for the order. The order may be paid for at the drive thru terminal/display 120 or at a different station. In an embodiment, where the order is paid for at the drive thru terminal/display 120, the drive thru terminal/display 120 includes a card reader 125 and/or a currency dispenser/accepter 126. Other forms of payment may be used as well, such as Apple Pay®, NCR's JetPay®, Venmo®, digital wallets, etc. Control is passed to the transaction manager 111 and these peripherals for confirming payment was received from the user either through a credit/debit card or through currency.

In an embodiment, when the voice interface 113, the drive thru voice interface 128, and/or the POS terminal 131 is unable to understand or translated the spoken words of the user during the order. The server/POS terminal agent 129 may initiate a voice call to a remote human ordering agent. This call can be initiated through cellular or through Voice over Internet Protocol (VoIP) from the drive thru terminal/display 120 to the remote order taker or a bank of order takers to select. The server/POS terminal agent 129 may then be remote controlled through an API by the order taker during the order, and selections or details for the order provided by the server/POS terminal agent 129 to the transaction manager 111 for processing with the local restaurant's ordering system/interface. In an embodiment, the call request is routed over connection 115 to the server/POS terminal 110 and the server/POS terminal 110 makes the call and provides the connection between the order taker and the user through the drive thru terminal/display 120 utilizing the display 121 and the microphone 122.

In an embodiment, the server/POS terminal agent 129 interacts with the wireless transceiver 127 to establish a connection to the mobile device 150 and communicate with the mobile application 151. In this embodiment, the user may conduct the voice-based order dialogue with the drive thru terminal/display 120 using the microphone of the mobile device 150 while remaining in the vehicle 140 with the windows of the vehicle 140 remaining up. Here, the voice-based feedback and guidance for the order/dialogue/transaction can be played over a speaker of the mobile device 150, over speaker 123 of the drive thru terminal/display 120 or over both the mobile device's speaker and the drive thru terminal/display's speaker. This may be particularly advantageous when there is inclement weather at the location associated with the drive thru terminal/display 120. Here, spoken user voice during the dialogue is provided over a wireless connection 145 (such as Bluetooth®) and feedback from the voice interface 113, the drive thru voice interface 128, and/or the POS terminal service 131 routed over the wireless connection 145 and played over a speaker that is integrated into the mobile device. Additionally, in this embodiment, the mobile application 151 may be used to display the visual feedback and guidance provided over the wireless connection 145 on a display of the mobile device 150. In some cases, the mobile application 151 may provide selectable and changeable options for the order that the user can make through an interface of the mobile application 151. So, the input microphone can be microphone 122 or a mobile device microphone, while the output speaker can be speaker 123 or a mobile device speaker. Furthermore, a text-based menu interface may be interacted with by the user through a mobile application user interface on the mobile device 150.

In an embodiment, the microphone 122 input source feed is routed over connection 135 to the voice-enabled network device 130 and the speaker output source feed of the voice-enabled network device 130 is routed over 135 to the speaker 123. Connection 135 also provides the speech-to-text translations made by the POS terminal service 131 to the drive thru voice interface 128. The drive thru voice interface 128 then uses the text transactions to translate into transaction manager 111 commands and provides to the server/POS terminal agent 129. The terminal agent 129 interacts with the transaction manager 111 through an API to have the commands for the order and the order details recorded for the transaction in the ordering system/interface. Output received from the transaction manager 111 is received by the terminal agent 129 and provided to the drive thru voice interface 128, the voice feedback is forwarded to the POS terminal service 131 and played over speaker 123 to the user. The terminal agent 129 also presents the feedback in visual format on the display 121, the visual format may include the images for items of the menu that were ordered (such as an image of a cheese burger, etc.) and text formatted feedback.

In an embodiment, the mobile application 151 makes a wireless connection 146 to the POS terminal service 131 and provides voice-based ordering through the microphone of the mobile device 150. Speech and voiced-based feedback is communicated back to the speakers of the mobile device 150 and/or also the speaker 123. Here, the POS terminal service 131 provides the voice input to the terminal agent 129 and plays the feedback for the order over the mobile device's speakers using connection 146. Separately, the POS terminal service 131 interacts with the drive thru voice interface 128 over a different connection 135 to permit the terminal agent 129 and the transaction manager 111 to process the order for the transaction in the manners discussed above. In this embodiment, the mobile application 151 reports its current geographical location and the POS terminal service 131 looks up an identifier for the terminal/display 120 based on the reported geographical location of the mobile device 150. This permits the POS terminal service 131 to make connection 135 with the appropriate terminal/display 120 that the vehicle 140 is located at.

In an embodiment, the voice-enabled network device 130 resides on server 110 or is connected to POS terminal 110 rather than connected to the drive thru terminal/display 120. In this embodiment the voice interface 113 manages voice to text and text to voice translations for interaction with the terminal agent 129 and/or transaction manager 111.

In an embodiment, the drive thru terminal/display 120 is a thin client, which includes just the display 121, the microphone 122, the speaker 123, optionally the camera/sensor 124, optionally the card reader 125, optionally the currency dispenser/accepter 126, optionally the wireless transceiver 127, and the terminal agent 129. In this embodiment, the terminal agent 129 provides speech received over 115 to the server/POS terminal 110 and all processing for the transaction/order/dialogue is processed on the server/POS terminal 110 with the drive through display manager 114 displaying the menu item images 112 on display 121 and the voice interface 113 playing the speech feedback over speaker 123.

The system 100 provides a variety of configurations for integrated a separate intelligent voice service with an existing ordering system/interface for purposes of allowing natural language based ordering at the drive thru terminal/display 120. The system 100 includes a variety of embodiments and additional order processing. The system 100 is customized for a specific restaurant type and specific menu of such a restaurant type, which allows for more accurate speech-to-text and text-to-speech processing. This is done with a restricted lexicon of words and phrases to identify user order commands, menu items (nouns), adjectives affecting the menu items, prepositions affecting menu items, and exclamations that confirm or do not confirm a given user order.

In an embodiment, the server/POS terminal 110 is a server 110. In an embodiment, the server 110 is a collection of servers that logically cooperate in a cloud processing environment. In an embodiment, the server 110 is connected over a Local Area Network (LAN) via 115 to the terminal/display 120. In an embodiment, the server 110 is connected over a Wide Area Network (WAN) through 115 to the terminal/display 120.

In an embodiment the server/POS terminal 110 is a POS terminal 110. The POS terminal 110 is a transaction terminal located within the restaurant. In an embodiment, the POS terminal 110 can be a Self-Service Terminal (SST) 110 located within the restaurant and remote from the terminal/display 120, and the SST 100 also permits other customers or users that come within the restaurant to concurrently place self-orders on touchscreen interface of the SST 100. In an embodiment, the POS terminal 110 is a cashier assisted transaction terminal within the restaurant that concurrently takes and processes orders for customers/users that come inside to eat at the restaurant. In an embodiment, the POS terminal 110 is connected to the terminal/display 120 over wireless connection 115. In an embodiment, the POS terminal is connected to the terminal/display over a wired connection 115.

In an embodiment, a separate SST includes the card reader 125 and the currency dispenser/accepter 126. The user engages in a completed voice-based dialogue order at the terminal/display 120 and pulls the vehicle ahead to the SST where the user is instructed to pay for the order to complete the transaction.

In an embodiment, the user engages in a completed voice-based dialogue order at the terminal/display 120 and pulls up to a window where the user pays for the order to complete the transaction.

In an embodiment, the user engages in a completed voice dialogue and pays for the order to complete the transaction at the terminal/display 120 utilizing card reader 125 and/or the currency dispenser/accepter 126. The user then pulls ahead and picks up the order at a window from a human agent or the user pulls ahead to a designated window or food storage bin that automatically unlocks when the order is completed. Any automated window/bin may not include a human agent; albeit a human agent may fulfill the order and pace it in the located bin or inside the locked window. In an embodiment, the order is fulfilled by automated robots and placed in a locked bin or inside the locked window.

The embodiments discussed above and other embodiments will not be discussed with reference to the FIGS. 2-4 below.

Figure 2:
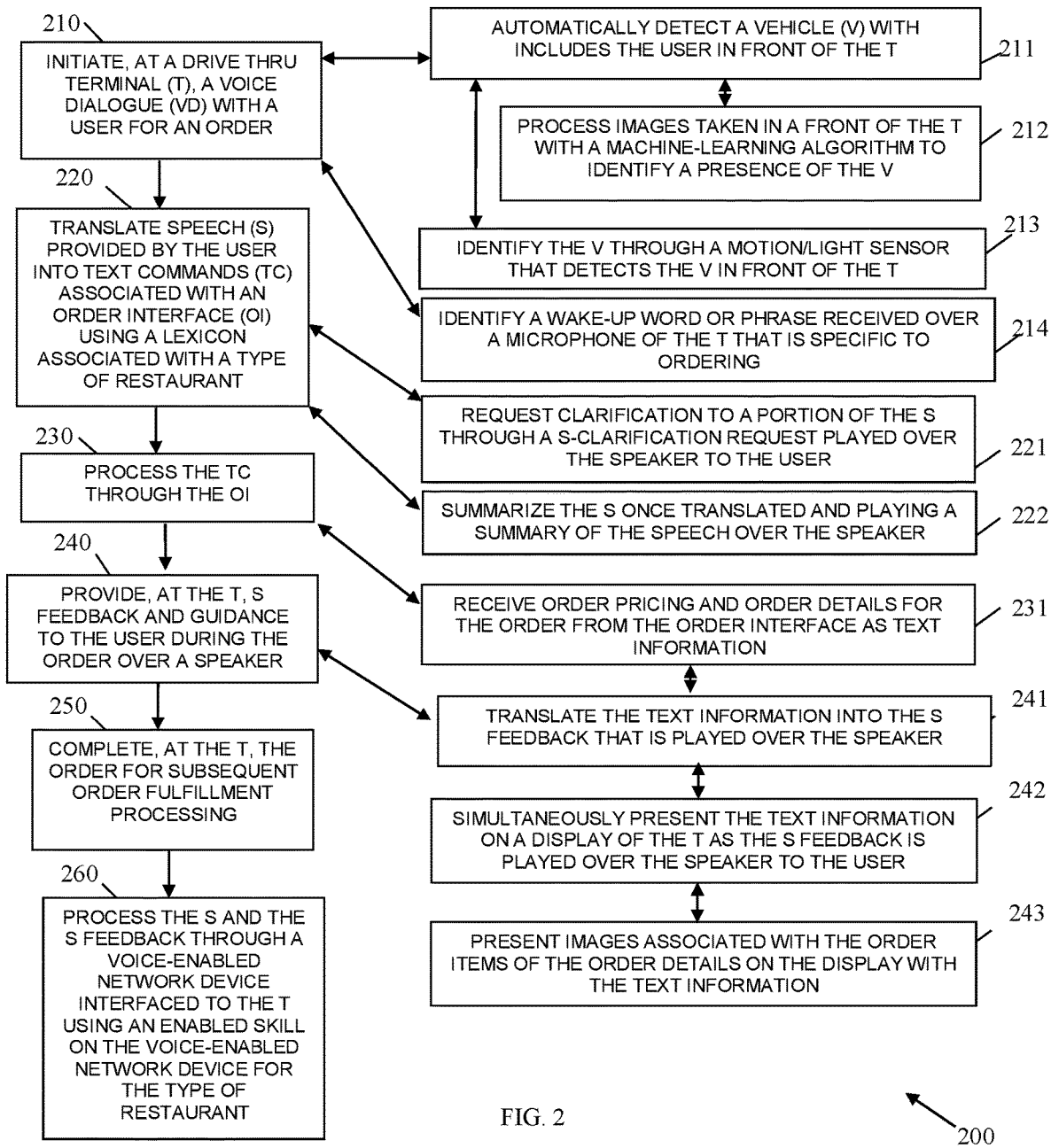
FIG. 2 is a diagram of a method for voice-based order processing, according to an example embodiment.

FIG. 2 is a diagram of a method 200 for voice-based order processing, according to an example embodiment. The software module(s) that implements the method 200 is referred to as a "voice-order service." The voice-order service is implemented as executable instructions programmed and residing within memory and/or a non-transitory computer-readable (processor-readable) storage medium and executed by one or more processors of a device. The processor(s) of the device that executes the transaction manager are specifically configured and programmed to process the voice-order service. The voice-order service has access to one or more networks during its processing. The networks can be wired, wireless, or a combination of wired and wireless.

In an embodiment, the device that executes the voice-order service is the drive thru terminal/display 120.

In an embodiment, the device that executes the voice-order service the server 110

In an embodiment, the device that executes the voice-order service is the POS terminal 110.

In an embodiment, the device that executes the voice-order service is the voice-enabled network device 130.

In an embodiment, a plurality of devices execute portions of the voice-order service, the devices include all of some combination of: the server/POS terminal 110, the drive thru terminal/display 120, the voice-enabled network device 130, and/or the mobile device 150.

In an embodiment, the voice-order service is all or some combination of: the transaction manager 111, voice interface 113, drive thru terminal/display manager 114, drive thru voice interface 128, server/POS terminal agent 129, POS terminal service 131, and/or mobile application 151.

At 210, the voice-order service initiates, at a drive thru terminal, an interactive voice dialogue/session with a user for an order. The user is situated within a vehicle in front of the drive thru terminal. In an embodiment, the drive thru terminal is the terminal/display 120.

In an embodiment, at 211, the voice-order service automatically detects a vehicle with includes the user in front of the drive thru terminal.

In an embodiment of 211 at 212, the voice-order service processes images taken in a front of the drive thru terminal with a machine-learning algorithm to identify a presence of the vehicle.

In an embodiment of 212 at 213, the voice order service identifies the vehicle through a motion or light sensor that detects the vehicle in front of the drive thru terminal.

In an embodiment, at 214, the voice-order service identifies a wake-up word or phrase received over a microphone of the drive thru terminal that is specific to ordering.

At 220, the voice-order service translates speech provided by the user into text commands associated with an order interface using a lexicon associated with a type of restaurant.

In an embodiment, at 221, the voice-order service requests clarification to a portion of the speech through a speech-clarification request played over the speaker to the user.

In an embodiment, at 222, the voice-order service summarizes the speech once translated and playing a summary of the speech over the speaker to the user.

At 230, the voice-order service processes text commands through the order interface.

In an embodiment, at 231, the voice-order service receives order pricing and order details from the order interface as text information.

At 240, the voice-order service provides, at the drive thru terminal, speech feedback and guidance to the user during the order over the speaker.

In an embodiment of 231 and 240, at 241, the voice-order service translates the text information into the speech feedback that is played over the speaker.

In an embodiment of 241 at 242, the voice-order service simultaneously presents the text information on a display of the drive thru terminal as the speech feedback is played over the speaker to the user.

In an embodiment of 242 at 243, the voice-order service presents images associated with the order items of the order details on the display with the text information. Each image is a customized picture or illustration of a given order item.

At 250, the voice-order service completes, at the drive thru terminal, the order for subsequent order fulfillment processing.

In an embodiment, at 260, the voice-order service processes the speech and the speech feedback through a voice-enabled network device interfaced to the drive thru terminal using an enabled skill on the voice-enabled network device for the type of restaurant. In an embodiment, the voice-enabled network device is an enhanced version of Siri®, Echo®, or Google Home® having the novel and enabled skill.

Figure 3:
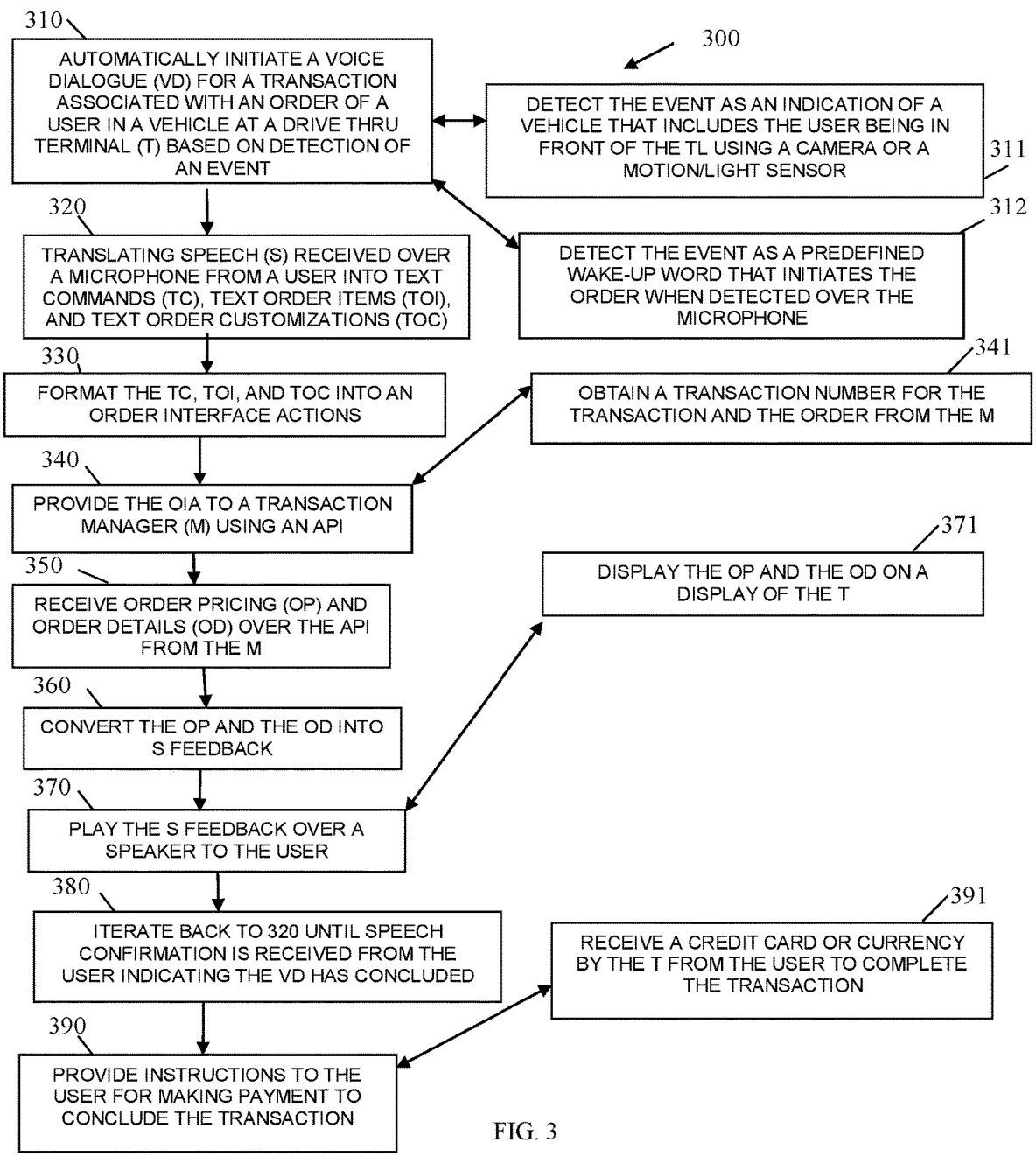
FIG. 3 is a diagram of another method for voice-based order processing, according to an example embodiment.

FIG. 3 is a diagram of another method 300 for voice-based order processing, according to an example embodiment. The software module(s) that implement the method 300 is referred to herein as a "drive thru voice-enabled service." The drive thru voice-enabled service is implemented as executable instructions and programmed within memory and/or a non-transitory computer-readable (processor-readable) storage medium that executes on one or more processors of a device. The processors of the device are specifically configured to execute the drive thru voice-enabled service. The drive thru voice-enabled service has access one or more networks; the networks are wireless.

In an embodiment, the drive thru voice-enabled service is all or some combination of: transaction manager 111, voice interface 113, drive thru terminal/display manager 114, drive thru voice interface 128, server/POS terminal agent 129, POS terminal service 131, and/or the mobile application 151.

In an embodiment, the device that executes the drive thru voice-enabled service is server 110.

In an embodiment, the device that executes the drive thru voice-enabled service is the POS terminal 110.

In an embodiment, the device that executes the drive thru voice-enabled service is the drive thru terminal/display 120.

In an embodiment, the device that executes the drive thru voice-enabled service is a combination of all of the devices 110, 120, 130 and/or 150.

At 310, the drive thru voice-enabled service automatically initiates a voice dialogue for a transaction associated with an order of a user in a vehicle at a drive thru terminal based on detection of an event.

In an embodiment, at 311, the drive thru voice-enabled service detects the event as an indication of a vehicle that includes the user being in front of the drive thru terminal using a camera or a motion/light sensor.

In an embodiment, at 312, the drive thru voice-enabled service detects the event as a predefined wake-up word that initiates the order when detected over the microphone.

At 320, the drive thru voice-enabled service translates speech received over a microphone from a user into text commands, text order items, and text order customizations.

At 330, the drive thru voice-enabled service formats the text commands, text order items, and text order customizations into an order interface actions.

At 340, the drive thru voice-enabled service provides the order interface actions to a transaction manager using an Application Programming Interface (API).

In an embodiment, at 341, the drive thru voice-enabled service obtains a transaction number for the transaction and the order from the transaction manager.

At 350, the drive thru voice-enabled service receives order pricing and order details over the API from the transaction manager.

At 360, the drive thru voice-enabled service converts the order pricing and the order details into speech feedback.

At 370, the drive thru voice-enabled service plays the speech feedback over a speaker to the user.

In an embodiment, at 371, the drive thru voice-enabled service obtains the order pricing and the order details on a display of the drive thru terminal.

At 380, the drive thru voice-enabled service iterates back to 320 until speech confirmation is received from the user indicating the voice dialogue has concluded.

At 390, the drive thru voice-enabled service provides instructions to the user for making payment to conclude the transaction.

In an embodiment, at 391, the drive thru voice-enabled service receives a credit card or currency by the drive thru terminal from the user to complete the transaction. It is to be noted that other non-card based forms of payment may also be processed, such as but not limited to: Apple Pay®, NCR JetPay®, Venmo®, digital wallets, virtual currency from a virtual currency wallet, etc.

Figure 4:
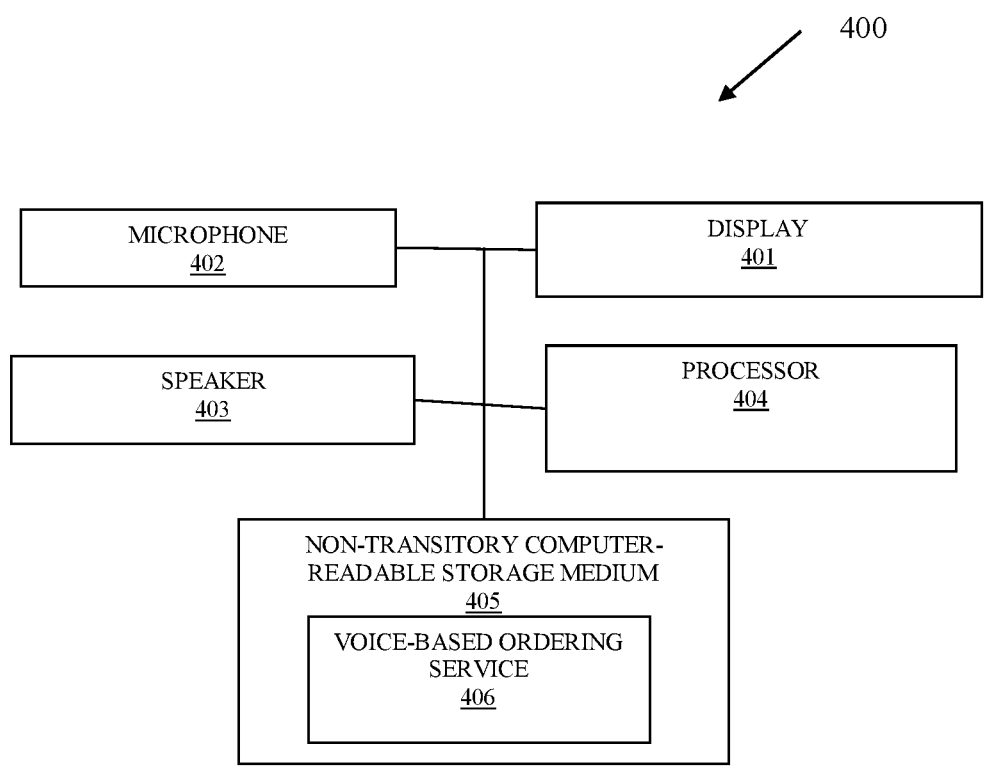
FIG. 4 is a diagram of another system for voice-based order processing, according to an example embodiment.

FIG. 4 is a diagram of a system 400 for voice-based order processing, according to an example embodiment. Some components of the system 400 are programmed and reside within memory and/or a non-transitory computer-readable medium and execute on one or more processors of devices of the system 400. The system 400 also has access and can communicate over one or more networks; and the networks are wireless, wired, or a combination of wired and wireless.

The system 400 is configured and programmed to perform the processing discussed above with the FIGS. 1-3.

The system 400 includes a display 401, a microphone 402, a speaker 403, a processor 404, and non-transitory computer-readable storage medium 405 having executable instructions representing a voice-based ordering service 406.

In an embodiment, the processor is included within one of: a server 110, a POS terminal 110, a SST 110, terminal/display 120, or voice-enabled network device 130.

In an embodiment, the voice-based ordering service 406 is all or some combination of one or more of: the transaction manager 111, the voice interface 113, the drive-thru terminal display manager 114, the drive thru voice interface 128, the terminal agent 129, the POS terminal service 131, the mobile application 151, the method 200, and/or the method 300.

When the processor 404 loads the executable instructions for the voice-based ordering service 406 from the non-transitory computer-readable storage medium 405 and executes the voice-based ordering service 406 this causes the processor 404 to: engage a user while in a vehicle at a drive thru terminal 120 in an interactive voice dialogue for taking an order at a restaurant; translate speech received over the microphone 402 during the interactive voice dialogue into text actions; process the text actions with an order interface; receive order pricing and order details from the order interface responsive to processing the text actions; communicate through speech feedback the order pricing and order details over the speaker 403; display the order pricing and order details on the display 401; confirm through speech interaction that the order is complete; and request a payment method from the user to complete the order for order fulfillment processing.

In an embodiment the voice-based ordering system 406 is further configured when executed by the processor to cause the processor 404 to: display unique images representing order items on the display 401 during the interactive voice dialogue.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing executable instructions to a processor of a device from a non-transitory computer-readable storage medium causing the processor to perform operations comprising:
automatically initiating, at a drive thru terminal, a voice dialogue with a user for an order in response to automatically detecting a vehicle including the user in front of the drive thru terminal, the automatically detecting comprising at least one of:
(i) processing images taken in front of a drive through terminal with a machine-learning algorithm to identify a presence of the vehicle;
(ii) detecting the vehicle through a motion or light sensor that detects the vehicle in front of the drive through terminal, the identifying generating a sensor-raised event; or,
(ii) detecting a wake-up word or phrase from user-provided speech received via a microphone of the drive through terminal;
playing an automated speech greeting to the user over a speaker based on the initiating and displaying the automated speech greeting as reproduced text presented on a display of the drive thru terminal;
obtaining a transaction identifier for a transaction with the user from a transaction manager associated with a Point-Of-Sale (POS) terminal of the drive thru terminal;
starting a session for the transaction, wherein the session is represented through the voice dialogue with the user;
translating speech provided by the user into text commands associated with an order interface using a lexicon for speech processing that is specific to menus and menu options associated with a specific type of restaurant;
processing the text commands through the order interface; providing, at the drive thru terminal, automated speech feedback and guidance to the user during the order over the speaker, wherein providing further includes producing the automated speech feedback and guidance by the processor while executing a portion of the operations;
completing, at the drive thru terminal, the order for subsequent order fulfillment processing; and
providing automated natural language-based ordering for the user through the drive thru terminal during the session customized for the specific type of restaurant, wherein the order is picked up by the user from a designated locked bin that unlocks when the order is fulfilled and placed in the bin.

2. The method of claim 1, wherein translating further includes requesting clarification to a portion of the speech through a speech-clarification request played over the speaker to the user.

3. The method of claim 1, wherein translating further includes summarizing the speech once translated and playing a summary of the speech over the speaker to the user.

4. The method of claim 1, wherein processing further includes receiving order pricing and order details from the order interface as text information.

5. The method of claim 4, wherein providing further includes translating the text information into the automated speech feedback that is played over the speaker.

6. The method of claim 5, wherein translating further includes simultaneously presenting the text information on the display of the drive thru terminal as the automated speech feedback is played over the speaker to the user.

7. The method of claim 6, wherein simultaneously presenting further includes presenting images associated with the order items of the order details on the display with the text information.

8. The method of claim 7 further comprising, processing the speech and the automated speech feedback through a voice-enabled network device interfaced to the drive thru terminal using an enabled skill on the voice-enabled network device for the specific type of restaurant.

9. A method, comprising:
providing executable instructions to a processor of a device from a non-transitory computer-readable storage medium causing the processor to perform operations comprising:
automatically initiating a voice dialogue for a transaction associated with an order of a user in a vehicle at a drive thru terminal based on detection of an event that triggers the automatically initiation based on image processing detecting the vehicle, a sensor detecting the vehicle, or a wake-up word or wake-up phrase spoken by the user into a microphone;
playing an automated speech greeting to the user over a speaker based on the initiating and displaying the automated speech greeting as reproduced text presented on a display of the drive thru terminal;
obtaining a transaction identifier for the transaction with the user from a transaction manager associated with a Point-Of-Sale (POS) terminal of the drive thru terminal;
starting a session for the transaction, wherein the session is represented through the voice dialogue with the user;
translating speech received over a microphone from a user into text commands, text order items, and text order customizations using speech processing that is based on a specific menu or specific menu options for a specific restaurant;
formatting the text commands, text order items, and text order customizations into an order interface actions;
providing the order interface actions to the transaction manager using an Application Programming Interface (API);
receiving order pricing and order details over the API from the transaction manager;
converting the order pricing and the order details into automated speech feedback, wherein converting further includes producing the automated speech feedback by the processor while executing a portion of the operations;
playing the automated speech feedback over the speaker to the user;
iterating back to the translating until speech confirmation is received from the user indicating the voice dialogue has concluded;
providing instructions to the user for making payment to conclude the transaction; and
providing automated natural language-based ordering for the user through the drive thru terminal during the session that is customized for the specific restaurant, wherein the order is picked up by the user from a designated locked bin that unlocks when the order is fulfilled and placed in the bin.

10. The method of claim 9, wherein automatically initiating further includes detecting the event as an indication of the vehicle that includes the user being in front of the drive thru terminal using a camera for the image processing, a motion/light sensor that raises a sensor event, or one of a plurality of predefined wake-up words or phrases.

11. The method of claim 9, wherein providing the order interface actions further includes obtaining a transaction number for the transaction and the order from the transaction manager.

12. The method of claim 9, wherein playing further includes displaying the order pricing and the order details on the display of the drive thru terminal.

13. The method of claim 12, wherein providing instructions further includes receiving a credit card or currency by the drive thru terminal from the user to complete the transaction.

14. A system, comprising:
a display;
a microphone;
a speaker;
a processor;
a non-transitory computer-readable storage medium having executable instructions representing a voice-based ordering service; and
the voice-based ordering service when executed by the processor for the non-transitory computer-readable storage medium cause the processor to perform operations, comprising:
automatically initiating an interactive voice dialogue for a transaction associated with an order of a user in a vehicle at a drive thru terminal based on detection of an event that triggers the automatically initiation based on image processing detecting the vehicle, a sensor detecting the vehicle, or a wake-up word or wake-up phrase spoken by the user into a microphone;
playing an automated speech greeting to the user over the speaker based on the initiating and displaying the automated speech greeting as reproduced text presented on the display of the drive thru terminal;
obtaining a transaction identifier for the transaction with the user from a transaction manager associated with a Point-Of-Sale (POS) terminal of the drive thru terminal;
starting a session for the transaction, wherein the session is represented through the interactive voice dialogue with the user;
engaging the user while in the vehicle at the drive thru terminal in the interactive voice dialogue for taking an order at a restaurant and the transaction identified by the transaction identifier, wherein the speech processing for engaging the user is based on a lexicon that is specific to a menu and menu options of the restaurant;
translating speech received during the interactive voice dialogue into text actions;
processing the text actions with an order interface;
receiving order pricing and order details from the order interface responsive to processing the text actions;
communicating through automated speech feedback the order pricing and order details over the speaker, wherein the automated speech feedback is produced by the processor while executing a portion of the operations;
displaying the order pricing and the order details on the display;

confirming through speech interaction that the order is complete;

requesting a payment method from the user to complete the order for order fulfillment processing providing automated natural language-based ordering for the user through the drive thru terminal during the session customized for the menu, wherein the order is picked up by the user from a designated locked bin that unlocks when the order is fulfilled and placed in the bin.

15. The system of claim 14, wherein the voice-based ordering service when executed by the processor further cause the processor to: display unique images representing order items on the display during the interactive voice dialogue.

* * * * *